Dec. 1, 1964   W. E. LEWIS ETAL   3,158,951
PULLEY RINGS FOR PURSE SEINES
Filed Feb. 19, 1962
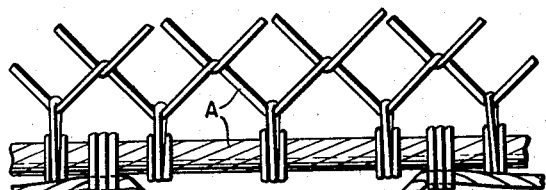
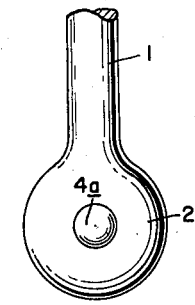
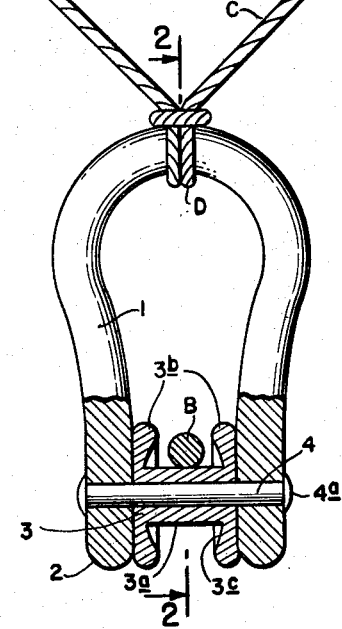
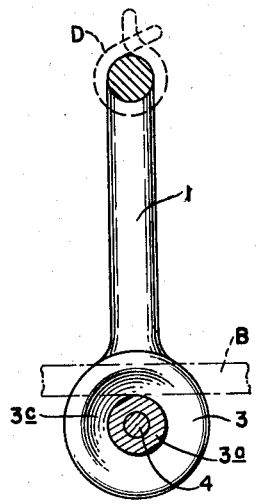
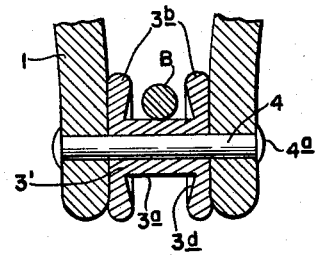
FIG. 4.
FIG. 1.
FIG. 2.
FIG. 3.
INVENTORS
Wallace E. Lewis &
Hanna R. Humphreys, Jr.
BY *J. Hanson Boyden*
ATTORNEY.

United States Patent Office 3,158,951
Patented Dec. 1, 1964

3,158,951
PULLEY RINGS FOR PURSE SEINES
Wallace E. Lewis, Beaufort, N.C., and Hanna R. Humphreys, Jr., White Stone, Va. (both % Standard Products Co., White Stone, Va.)
Filed Feb. 19, 1962, Ser. No. 173,911
6 Claims. (Cl. 43—8)

This invention relates to fishing nets, and more particularly to purse seines.

For many years it has been the common practice to secure a series of plain rings along the lower edge of a purse seine, and pass a purse line through these rings, this purse line being operatively connected at its ends to suitable winding or pulling mechanism so that the bottom of the seine may be drawn together or closed when desired. It is not unusual for fifty or more rings to be employed on a seine of commercial size.

It has been found in practice that the frictional drag on the line running through this series of rings is very great, imposing a tremendous load on the pulling mechanism, and thus unduly increasing the difficulty of properly drawing in the seine. Moreover, the friction frequently wears through some of the rings, thus rendering them useless, and also produces excessive wear on the line. This presents a serious problem, where, as in recent years, extensive use has been made of nylon lines, which are relatively expensive.

It is therefore the general object of the present invention to overcome these objections and difficulties by providing means for effectively reducing the frictional drag on the line and the excessive wear on the rings and on the line. This we achieve by substituting for the ordinary ring heretofore employed what, for lack of a better name, we shall call "pulley rings" or "roller rings." These comprise a clevis or shackle in which is mounted a pulley or roller over which the line passes.

A specific object of the invention is to devise such a pulley ring which shall be simple and rugged in construction, and shall tend to be "non-fouling," that is to say, shall be entirely free from any sharp edges or projections on which the line or net might catch or become entangled or cut.

Another specific object is to devise a pulley or roller so shaped that the purse line does not tend to ride or climb up off of it, and thus drag against the clevis.

With the above and other objects in view, and to improve generally on the details of such equipment, the invention consists in the construction and combination of parts hereinafter described and claimed, and illustrated in the accompanying drawing, forming part of this specification, and in which:

FIG. 1 is a side elevation of one of our improved pulley rings, showing a fragment of the seine to which it is attached, parts being in section;

FIG. 2 is a longitudinal section substantially on the line 2—2 of FIG. 1;

FIG. 3 is a fragmentary sectional view similar to the lower part of FIG. 1, but showing a slightly modified form of roller; and FIG. 4 is a side elevation of the lower part of the clevis shown in FIG. 1.

Referring to the drawing in detail, one form of our improved pulley ring is shown in FIGS. 1 and 2. The device comprises a substantially inverted U-shaped shackle or clevis 1 formed from solid bar stock, preferably of circular cross section, the ends of the arms of the clevis being enlarged as indicated at 2. These enlarged ends are circular in elevation, as shown in FIG. 4, and have their edges rounded to form a continuation of the rounded surface of the body of the clevis.

Mounted between the ends 2 of the clevis is a roller 3 journaled on a pin 4 extending through openings in arms 2 of the clevis. As clearly shown in FIG. 1, this roller has a length which is relatively large as compared with its diameter. The roller comprises a body $3^a$ which is substantially cylindrical, and radial flanges $3^b$ at each end of the body. These flanges are disposed at right angles to the body of the roller, and preferably have rounded peripheries, as shown. The roller occupies the entire space between the arms and the diameter of the end flanges $3^b$ thereof is substantially no larger than the ends 2 of the clevis.

The pin 4 is held in position by slightly upsetting the ends, as shown at $4^a$ in FIG. 1, these upset ends being substantially flush with the outer surface of the arms of the clevis.

The seine or net is shown at A and the purse line at B. This line passes through the clevis 1 and is supported on the rollers 3. The clevises are flexibly attached to the lower edge of the net, as by a line C, which is secured to the lower edge thereof at intervals, as shown in FIG. 1, and is formed with a series of bights, each of which is looped around the middle portion or bend of the clevis, as shown at D.

From the foregoing, it will be seen that our improved clevis and roller 3 have a rounded smooth surface throughout and are entirely free from any projections such as might snag or foul the line. The purse line B is supported on the rollers 3, as shown, and, due to the fact that these rollers freely turn, both the frictional resistance to the movement of the line and the wear on the line are substantially reduced. A seine equipped with our improved pulley rings is very much easier to purse and the life of the purse line is substantially lengthened.

Referring again to FIG. 1, it will be particularly noted that the inner faces of the radial flanges are undercut near their central portions, as indicated at $3^c$, to produce a curved or concave surface. The purpose of this is to reduce any "foot hold" by which the purse line might climb up out of the roller. By reason of the flexible support C, the clevis can freely turn and twist in every direction, and the purse line might be easily dislodged from the groove of a conventional pulley. But with our improved construction of roller, the line engages only the periphery of the end flanges, and thus is held securely in place, in all positions which the clevis may assume.

In FIG. 3 we have shown a slightly modified construction in which the inner end faces of the flanges are inwardly inclined but formed with a flat surface as shown at $3^d$, instead of the curved surface $3^c$ of FIG. 1. In either case, however, these inner faces can be defined as "concave," and the result is the same.

What we claim is:

1. A pulley ring for purse seines comprising a clevis having a pair of arms, means for flexibly attaching said clevis to the seine, and a roller mounted between the ends of said arms, said roller having a substantially cylindrical body with radial end flanges disposed at substantial right angles thereto.

2. A pulley ring in accordance with claim 1 in which the body of the cylindrical roller is relatively long as compared with its diameter.

3. A pulley ring in accordance with claim 1 in which the inner faces of the radial end flanges are concave.

4. A pulley ring in accordance with claim 1 in which the inner sides of the peripheries of the radial end flanges are closer together than the central portions of said flanges, and said peripheries are rounded.

5. A pulley ring in accordance with claim 1 in which the inner faces of the radial end flanges are undercut at the central regions thereof, whereby any tendency of the purse line to climb up said flanges and off of the roller is reduced.

6. The combination with a purse seine, of a series of pulley rings carried at the lower edge thereof, each pulley ring comprising a clevis having a pair of arms, a loop of rope securing each pulley ring to said seine, and a roller mounted between the ends of said arms, said roller having an approximately cylindrical body with radial end flanges disposed at substantial right angles thereto.

References Cited by the Examiner
UNITED STATES PATENTS

| | | | |
|---|---|---|---|
| 297,026 | 4/84 | Smith | 254—197 |
| 2,709,616 | 5/55 | Larson et al. | 254—195 |
| 2,733,530 | 2/56 | Puretic | 43—8 |

ABRAHAM G. STONE, *Primary Examiner.*
SAMUEL KOREN, JOSEPH S. REICH, *Examiners.*